United States Patent
Lee (10) Patent No.: US 8,911,915 B2
(45) Date of Patent: Dec. 16, 2014

(54) HYDROCARBON COMPOSITE ELECTROLYTE MEMBRANE FOR FUEL CELL

(75) Inventor: Hoon Hui Lee, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 110 days.

(21) Appl. No.: 13/314,026

(22) Filed: Dec. 7, 2011

(65) Prior Publication Data
US 2013/0065154 A1    Mar. 14, 2013

(30) Foreign Application Priority Data
Sep. 8, 2011 (KR) .................. 10-2011-0091432

(51) Int. Cl.
*H01M 8/10* (2006.01)

(52) U.S. Cl.
CPC ............ *H01M 8/1051* (2013.01); *Y02E 60/521* (2013.01); *H01M 2300/0091* (2013.01); *H01M 2300/0082* (2013.01); *Y02E 60/50* (2013.01); *H01M 2300/0094* (2013.01); *H01M 2008/1095* (2013.01); *H01M 8/1053* (2013.01)
USPC .......................................... 429/465; 429/464

(58) Field of Classification Search
USPC .................................. 429/464, 465
See application file for complete search history.

(56) References Cited

U.S. PATENT DOCUMENTS

| 2007/0077478 A1 | 4/2007 | Nguyen et al. | |
| 2007/0128464 A1 | 6/2007 | Jang | |
| 2008/0280169 A1* | 11/2008 | Niu et al. | 429/13 |
| 2009/0208806 A1* | 8/2009 | Izuhara et al. | 429/33 |

FOREIGN PATENT DOCUMENTS

KR    10-0668357 B1    1/2007

OTHER PUBLICATIONS

N.P. Cele et al.; Carbon Nanotube Based Nafion Composite Membranes for Fuel Cell Applications; Fuel Cells vol. 10, No. 1, pp. 64-71, 2010.
Mukhopadhyay et al.; Trends and Frontiers in Graphene-Based Polymer Nanocomposites; Plastics Engineering pp. 32-42, Jan. 2011.
Zarrin, Hadis et al., Functionalized graphene oxide as a new highly proton conductive composite membrane for high temperature PEMFCs, Abstract #643, 219th ECS Meeting, © 2011 The Electrochemical Society.
Ramanathan, T. et al., Functionalized graphene sheets for polymer nanocomposites, Nature Nanotechnology, vol. 3, Jun. 2008 pp. 327-331.

* cited by examiner

*Primary Examiner* — Jonathan Jelsma
(74) *Attorney, Agent, or Firm* — Edwards Wildman Palmer LLP; Peter F. Corless (57) ABSTRACT

The present invention provides a hydrocarbon composite electrolyte membrane for a fuel cell, which is formed of an inexpensive hydrocarbon electrolyte membrane to ensure mechanical and thermochemical stability. The present invention provides a hydrocarbon composite electrolyte membrane for a fuel cell, the hydrocarbon composite electrolyte membrane including at least one composite electrolyte membrane layer having a structure in which graphene nanostructures are impregnated into a hydrocarbon electrolyte membrane.

13 Claims, 7 Drawing Sheets

Hydrocarbon electrolyte membrane repeatedly contracts
⟶ and thus is mechanically damaged

FIG. 1A

PRIOR ART

MEA manufacturing condition (Decal method)
⟶ Heated (during hot press)

When hydrocarbon electrolyte
⟶ membrane has low thermal

FIG. 1B

PRIOR ART

HYDROCARBON COMPOSITE ELECTROLYTE MEMBRANE FOR FUEL CELL

CROSS-REFERENCE TO RELATED APPLICATION

This application claims under 35 U.S.C. §119(a) the benefit of Korean Patent Application No. 10-2011-0091432, filed Sep. 8, 2011, the entire contents of which are incorporated herein by reference.

BACKGROUND (a) Technical Field

The present invention relates to an electrolyte membrane for a fuel cell. More particularly, it relates to a hydrocarbon composite electrolyte membrane for a fuel cell, which is formed of an inexpensive hydrocarbon electrolyte membrane to ensure mechanical and thermochemical stability.

(b) Background Art

A fuel cell is an electricity generation system that converts chemical energy directly into electrical energy in a fuel cell stack. A fuel cell can be used as an electric power supply for small-sized electrical and electronic devices. For example, a fuel cell may be used for portable devices, industrial and household appliances, and automobiles.

One of the most attractive fuel cells for use in a vehicle is a proton exchange membrane fuel cell or a polymer electrolyte membrane fuel cell (PEMFC), which has the highest power density among the various types of fuel cells. The PEMFC has a fast start-up time and a fast reaction time for power conversion due to its low operation temperature.

The PEMFC comprises a fuel cell stack that includes a membrane-electrode assembly (MEA), a gas diffusion layer (GDL), a gasket and a sealing member, and a bipolar plate. The MEA in which an electrolyte/catalyst layer where an electrochemical reaction takes place is disposed on each side of a polymer electrolyte membrane through which hydrogen ions are transported. The GDL functions to uniformly diffuse reactant gases and transmit generated electricity. The gasket and a sealing member function to provide an appropriate airtightness to reactant gases and coolant, as well as to provide an appropriate bonding pressure. The bipolar plate functions to transmit reactant gases and coolant.

When the fuel cell stack is assembled using a plurality of unit cells, a combination of the MEA and the GDL is positioned in the center of each unit cell of the fuel cell stack. The MEA includes a cathode and an anode as the electrode/catalyst layer, which is where an electrochemical reaction between hydrogen and oxygen takes place, disposed on both sides of the polymer electrolyte membrane. Moreover, the GDL and the gasket are sequentially stacked on both sides of the MEA, where the cathode and the anode are located.

The bipolar plate includes flow fields, through which the reactant gases (such as hydrogen as a fuel and oxygen or air as an oxidant) and coolant passes, and is disposed on the outside of the GDL.

After the plurality of unit cells are stacked together, an end plate for supporting a current collector, an insulating plate, and the stacked cells are connected to the outermost end, and the unit cells are repeatedly stacked between the end plates, thus forming the fuel cell stack.

A fuel cell vehicle equipped with a fuel cell stack is advantageous in that it is an environmentally-friendly vehicle that emits no exhaust gas; however, it suffers from a disadvantage in that it is difficult to commercialize due to high manufacturing costs.

As mentioned above, the MEA is a key component of the fuel cell and generally includes electrodes (such as the cathode and the anode) and an electrolyte. In the conventional art, fluorine electrolyte membranes (e.g., perfluorosulfonic acid) are being used; however, such membranes suffer from the disadvantage that they are very expensive.

Therefore, hydrocarbon electrolyte membranes (such as, e.g., sulfonated poly(phenylene)s, poly(ether ether ketone)s, and the like) have been extensively studied in an effort to develop inexpensive electrolyte membranes.

Figure 1A:
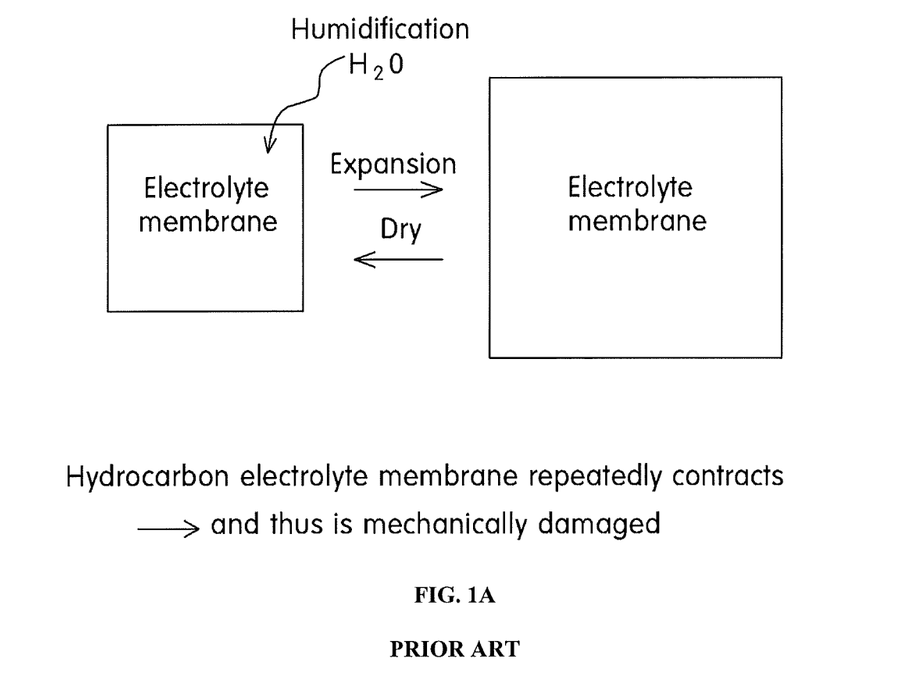
FIGS. 1A and 1B are diagrams showing problems of a conventional art hydrocarbon electrolyte membrane.

As shown in FIG. 1A, a conventional art hydrocarbon electrolyte membrane repeatedly contracts and expands during fuel cell operation as a result of water loss and water gain, respectively. Disadvantageously, these repeated cycles of contraction and expansion may result in the hydrocarbon electrolyte membrane being mechanically damaged due to significant dimensional changes caused by water gain and loss.

Figure 1B:
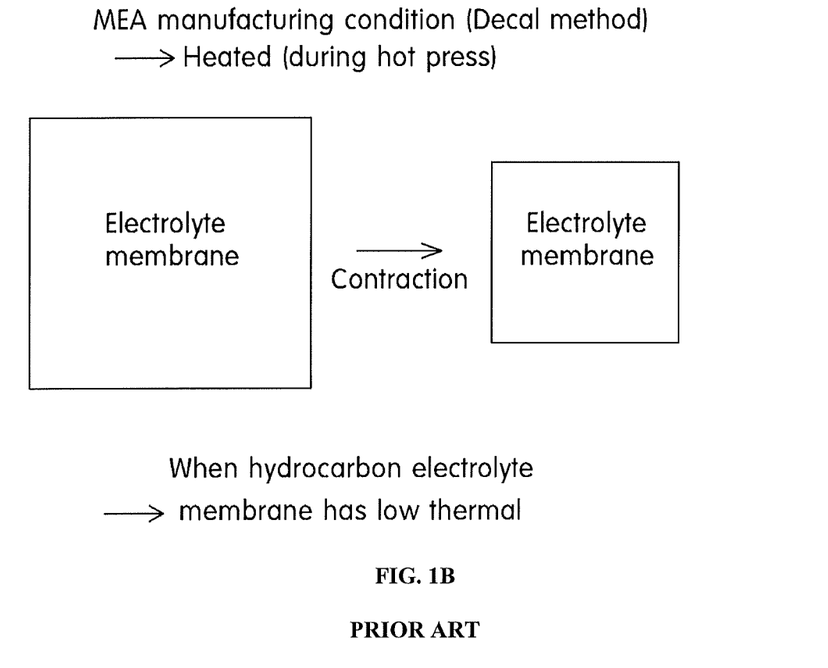

Moreover, when the MEA is made by a decal method, the electrodes and the electrolyte membrane are heated during a hot press process, and as a result the electrolyte contracts as shown in FIG. 1B. This is another example of a disadvantage of a conventional art hydrocarbon electrolyte membrane as the membrane may be mechanically damaged due to low thermal resistance.

In view of the foregoing, it is clear that conventional art hydrocarbon electrolyte membranes are not well suited to be used as the MEA of a fuel cell due to low mechanical stability and thermochemical durability.

The above information disclosed in this Background section is only for enhancement of understanding of the background of the invention.

SUMMARY OF THE DISCLOSURE

The present invention provides a hydrocarbon composite electrolyte membrane for a fuel cell, which is formed by mixing and dispersing graphene nanostructures with a hydrocarbon electrolyte membrane to ensure mechanical and thermochemical stability.

In one aspect, the present invention provides a hydrocarbon composite electrolyte membrane for a fuel cell, and the hydrocarbon composite electrolyte membrane includes at least one composite electrolyte membrane layer having a structure in which graphene nanostructures are embedded into a hydrocarbon electrolyte membrane.

In an exemplary embodiment, the composite electrolyte membrane layer may be formed of a composition prepared by mixing 90 to 99.9 wt % of hydrocarbon polymer solution and 0.1 to 10 wt % of graphene nanostructures.

In another exemplary embodiment, the composite electrolyte membrane layer may include a hydrocarbon electrolyte membrane layer disposed on both sides of the composite electrolyte membrane layer.

In another aspect, the present invention provides a membrane electrode assembly including the hydrocarbon composite electrolyte membrane.

In still another aspect, the present invention provides a fuel cell stack including the membrane electrode assembly.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 2A shows an intercalated structure and FIG. 2B shows an exfoliated structure.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Unless specifically stated or obvious from context, as used herein, the term "about" is understood as within a range of normal tolerance in the art, for example within 2 standard deviations of the mean. "About" can be understood as within 5%, 4%, 3%, 2%, 1%, 0.5%, 0.1%, 0.05%, or 0.01% of the stated value. Unless otherwise clear from the context, all numerical values provided herein are modified by the term "about."

Ranges provided herein are understood to be shorthand for all of the values within the range. For example, a range of 1 to 50 is understood to include any number, combination of numbers, or sub-range from the group consisting of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50, as well as all intervening decimal values between the aforementioned integers such as, for example, 1.1, 1.2, 1.3, 1.4, 1.5, 1.6, 1.7, 1.8, and 1.9.

The present invention provides a hydrocarbon composite electrolyte membrane for a fuel cell, which has a structure in which graphene nanostructures are embedded and dispersed into an inexpensive hydrocarbon electrolyte membrane to ensure mechanical and thermochemical stability, thus satisfying the performance requirements for an electrolyte membrane of a membrane electrode assembly.

The hydrocarbon composite electrolyte membrane for a fuel cell according to the present invention is characterized by a structure in which graphene nanostructures are embedded and dispersed into a hydrocarbon electrolyte membrane.

Figure 2:
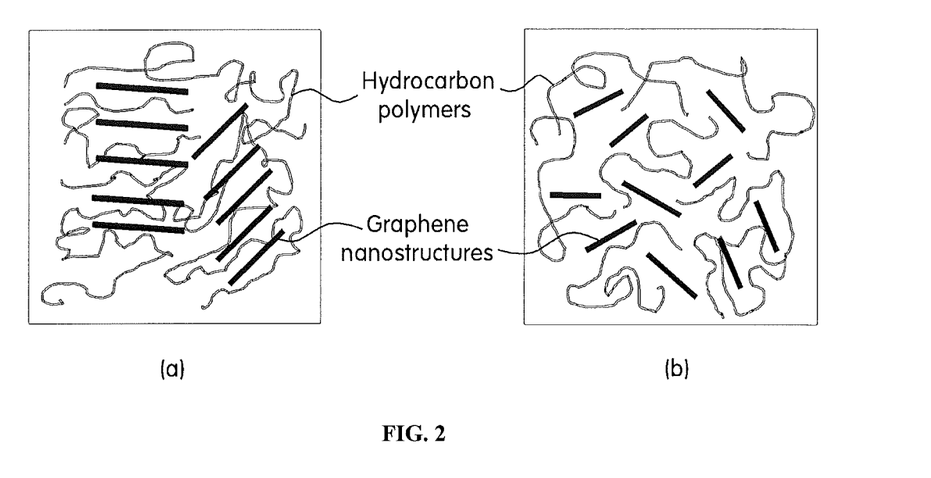
FIGS. 2A and 2B are schematic diagrams showing the structure of a hydrocarbon composite electrolyte membrane for a fuel cell in accordance with an exemplary embodiment of the present invention, where

As shown in FIG. 2, a hydrocarbon composite electrolyte membrane according to the present invention has a structure in which graphene nanostructures are embedded and dispersed into hydrocarbon polymers of an electrolyte membrane. For example, the hydrocarbon composite electrolyte membrane according to the present invention includes at least one composite electrolyte membrane layer 10 having a structure in which graphene nanostructures are embedded into a hydrocarbon electrolyte membrane. The composite electrolyte membrane layer 10 may be formed by extruding or casting a composition, which is prepared by adding graphene nanostructures to a hydrocarbon polymer solution (or a hydrocarbon electrolyte solution), and forming the composition into a predetermined shape. For example, the hydrocarbon polymer solution may be a solution used to form a conventional hydrocarbon electrolyte membrane. Preferably, the composite electrolyte membrane layer 10 may be formed of a composition prepared by mixing 90 to 99.9 wt % hydrocarbon polymer solution and 0.1 to 10 wt % graphene nanostructures.

It is also contemplated within the scope of the invention that the amount of hydrocarbon polymer solution may range from about 90 to about 90.5, 91, 91.5, 92, 92.5, 93, 93.5, 94, 94.5, 95, 95.5, 96, 96.5, 97, 97.5, 98, 98.5, 99, or 99.9 wt %. It is also contemplated within the scope of the invention that the amount of hydrocarbon polymer solution may range from about 99.9 to about 99, 98.5, 98, 97.5, 97, 96.5, 96, 95.5, 95, 94.5, 94, 93.5, 93, 92.5, 92, 91.5, 91, 90.5, or 90 wt %. It is further contemplated that the amount of hydrocarbon polymer solution may be about 90, about 90.5, about 91, about 91.5, about 92, about 92.5, about 93, about 93.5, about 94, about 94.5, about 95, about 95.5, about 96, about 96.5, about 97, about 97.5, about 98, about 98.5, about 99, or about 99.9 wt %.

It is also contemplated within the scope of the invention that the amount of graphene nanostructures may range from 0.1 to about 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or 10 wt %. The amount of graphene nanostructures may also range from 10 to about 9.5, 9.0, 8.5, 8.0, 7.5, 7.0, 6.5, 6.0, 5.5, 5.0, 4.5, 4.0, 3.5, 3.0, 2.5, 2.0, 1.5, 1.0, 0.5, or 0.1 wt %. The amount of graphene nanostructures may also be 0.1, about 0.5, about 1.0, about 1.5, about 2.0, about 2.5, about 3.0, about 3.5, about 4.0, about 4.5, about 5.0, about 5.5, about 6.0, about 6.5, about 7.0, about 7.5, about 8.0, about 8.5, about 9.0, about 9.5, or 10 wt %.

If the content of graphene nanostructures is less than 0.1 to 10 wt %, it is difficult to obtain a composition that will sufficiently improve the mechanical and thermochemical stability of the composite electrolyte membrane layer 10. On the other hand, if the content of graphene nanostructures exceeds 10 wt %, the electrical conductivity of the composite electrolyte membrane layer 10 is increased, and the composite electrolyte membrane layer 10 is no longer preferably used as an electrolyte membrane for a fuel cell.

A hydrocarbon electrolyte membrane layer 20 is disposed on both sides of the composite electrolyte membrane layer 10.

The hydrocarbon composite electrolyte membrane of the present invention, in which the graphene nanostructures, an electrically conductive material, are added to the hydrocarbon polymer solution to impart electrical conductivity to the composite electrolyte membrane layer 10, has a structure in which the insulating hydrocarbon electrolyte membrane layers 20 are stacked on both sides of the composite electrolyte membrane layer 10 to ensure the electrical insulation. The hydrocarbon electrolyte membrane layer 20 may comprise a conventional hydrocarbon electrolyte membrane to which no graphene particles are added.

Figure 3:
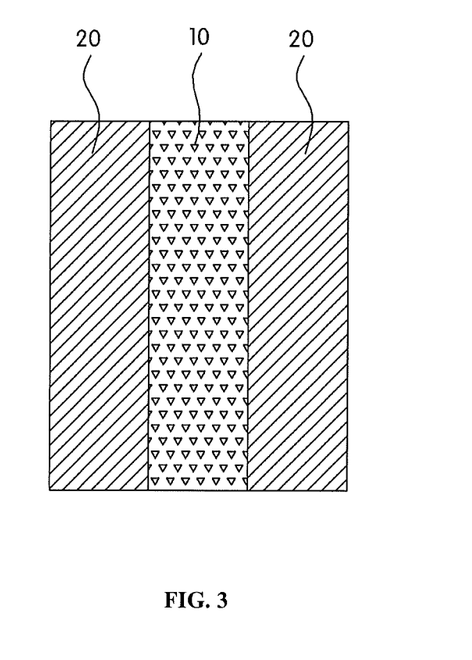
FIG. 3 is a cross-sectional view showing the configuration of a hydrocarbon composite electrolyte membrane for a fuel cell in accordance with an exemplary embodiment of the present invention.

Referring to FIG. 3, the hydrocarbon composite electrolyte membrane in accordance with an exemplary embodiment of the present invention may include the composite electrolyte membrane layer 10 and the hydrocarbon electrolyte membrane layers 20 stacked on both sides of the composite electrolyte membrane layer 10.

As mentioned above, the hydrocarbon composite electrolyte membrane of the present invention should have a structure in which the hydrocarbon electrolyte membrane layers 20 are stacked on both sides of the composite electrolyte membrane layer 10 to which the graphene nanostructures are added, and thus comprises at least three layers.

Figure 4:
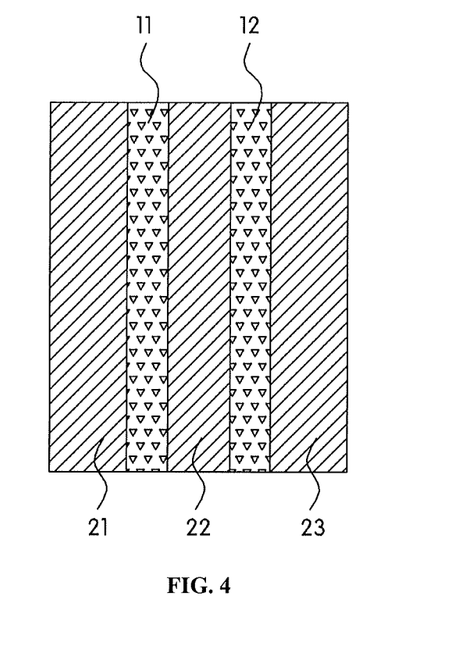
FIG. 4 is a cross-sectional view showing the configuration of a hydrocarbon composite electrolyte membrane for a fuel cell in accordance with another exemplary embodiment of the present invention.

Referring to FIG. 4, a hydrocarbon composite electrolyte membrane in accordance with another exemplary embodiment of the present invention may have a five-layered structure including two composite electrolyte membrane layers 11 and 12 and three hydrocarbon electrolyte membrane layers 21, 22, and 23, in which one hydrocarbon electrolyte membrane layer 22 is interposed between the two composite electrolyte membrane layers 11 and 12 and the other hydrocarbon electrolyte membrane layers 21 and 23 are stacked on the outer sides of the composite electrolyte membrane layers 11 and 12, respectively. When at least two composite electrolyte membrane layers 11 and 12 are included in the hydrocarbon composite electrolyte membrane of the present invention, the hydrocarbon electrolyte membrane layer 22 is interposed between the composite electrolyte membrane layers 11 and 12 to ensure insulation therebetween. For example, the hydrocarbon electrolyte membrane layer 22 should be sandwiched in between the composite electrolyte membrane layers 11 and 12. Similarly, composite electrolyte membrane layer 11 should be sandwiched between hydrocarbon electrolyte membrane layer 21 and 22, and composite electrolyte membrane layer 12 should be sandwiched between hydrocarbon electrolyte membrane layer 22 and 23. Accordingly, when at least two composite electrolyte membrane layers 11 and 12 are included in the hydrocarbon composite electrolyte membrane, the hydrocarbon electrolyte membrane layer 22 overlaps its structural role in sandwiching the composite electrolyte membrane layers 11 and 12, in that it is a member of two sets of sandwiching hydrocarbon electrolyte membranes: 21 and 22, and 22 and 23. In other words, only one hydrocarbon electrolyte membrane layer 22 is interposed between the two composite electrolyte membrane layers 11 and 12 as shown in FIG. 4.

In another exemplification, the composite electrolyte membrane layer embedded with graphene nanostructures may be formed and manufactured by the following processes.

The composite electrolyte membrane layer may be formed by mixing a graphene nanostructure suspension, which is prepared using graphene nanostructures and a solvent, with an electrolyte solution (i.e., a hydrocarbon polymer solution) and extracting or casting the mixture. The solvent may include, but is not limited to, hydrazine monohydrate, sodium borohydride, benzyl alcohol, and the like. The graphene nanostructures may include, but is not limited to, graphene oxide nanoflakes. The graphene nanostructure suspension and the electrolyte solution may be mixed by stirring or sonication in which graphene oxides (such as, e.g., graphene nanostructures) are bonded to hydrocarbon polymers and reduced.

For example, the composite electrolyte membrane layer may be formed by adding graphene nanostructures to an electrolyte solution, which is prepared by dissolving a typical hydrocarbon electrolyte, and extruding or casting the mixture.

For example, the composite electrolyte membrane layer may be formed by mixing graphene nanostructures with hydrocarbon monomers to be subjected to in-situ polymerization and extruding or casting the mixture.

As another example, the composite electrolyte membrane layer may be formed by bonding graphene nanostructures to hydrocarbon monomers using covalent bonds between functional groups contained in the graphene nanostructures and the hydrocarbon electrolyte membrane, and polymerizing the resulting monomers. The graphene nanostructures may be bonded to the hydrocarbon monomers using amine, isocyanate, N-dimethylformamide, and the like.

Figure 5:
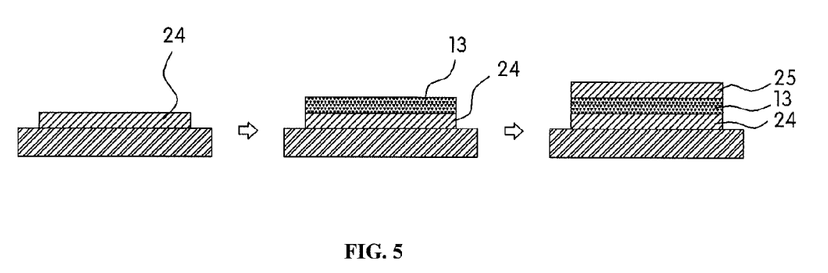
FIGS. 5, 6, and 7 are cross-sectional views showing a process of manufacturing a hydrocarbon composite electrolyte membrane for a fuel cell in accordance with the present invention.
Figure 6:
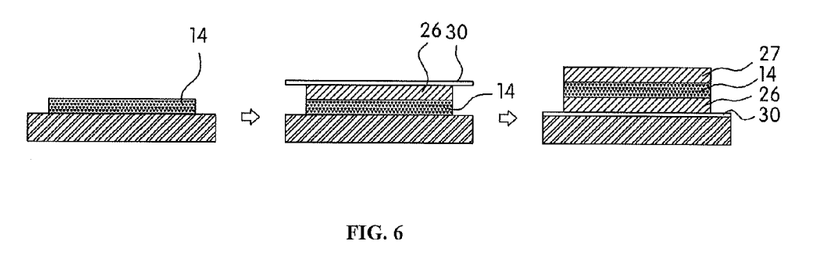
Figure 7:
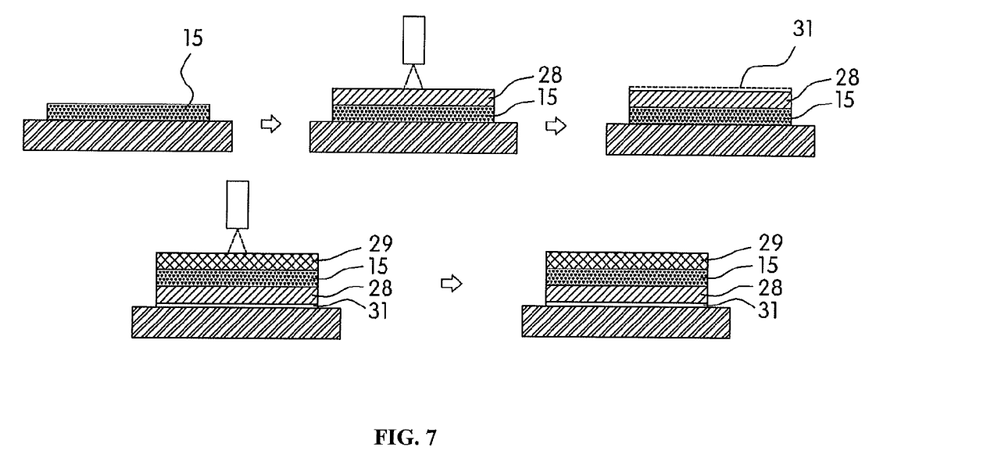

The hydrocarbon composite electrolyte membrane having a multi-layered structure according to the present invention may be manufactured using the composite electrolyte membrane layer formed in the above-described manner by general multilayer casting process and spray process as shown in FIGS. 5 to 7.

Referring to FIG. 5, a hydrocarbon polymer solution is cast to form a hydrocarbon electrolyte membrane layer 24. A hydrocarbon polymer solution is mixed with graphene nanostructures and cast on the hydrocarbon electrolyte membrane layer 24 to form a composite electrolyte membrane layer 13. A hydrocarbon polymer solution is cast on the composite electrolyte membrane layer 13 to form a hydrocarbon electrolyte membrane layer 25, thereby forming a hydrocarbon composite electrolyte membrane having a three-layered structure.

Referring to FIG. 6, a hydrocarbon polymer solution mixed with graphene nanostructures may be cast to form a composite electrolyte membrane layer 14. A hydrocarbon polymer solution may be cast on the composite electrolyte membrane layer 14 to form a hydrocarbon electrolyte membrane layer 26. A supporting film 30 may be stacked on the hydrocarbon electrolyte membrane layer 26, and the resulting stack is turned upside down so that the supporting film 30 is located on the bottom. Then, the hydrocarbon polymer solution is cast on the composite electrolyte membrane layer 14, which is now located at the top of the stack, to form a hydrocarbon electrolyte membrane layer 27, thereby forming a hydrocarbon composite electrolyte membrane having a three-layered structure.

Referring to FIG. 7, a hydrocarbon polymer solution mixed with graphene nanostructures may be cast to form a composite electrolyte membrane layer 15 in the same manner as FIG. 6. A hydrocarbon polymer solution may then be sprayed onto the composite electrolyte membrane layer 15 to form a hydrocarbon electrolyte membrane layer 28, and a supporting film 31 may be stacked on the hydrocarbon electrolyte membrane layer 28. The resulting stack may then be turned upside down such that the supporting film 31 is located at the bottom of the stack. The hydrocarbon polymer solution may be sprayed onto the composite electrolyte membrane layer 15 located at the top to form a hydrocarbon electrolyte membrane layer 29, which is dried, thereby forming a hydrocarbon composite electrolyte membrane having a three-layered structure.

One of skill in the art will appreciate that the above described processes may be easily scaled up to generate membranes with increasing numbers of layers (such as, e.g., a 5 layered membrane).

The hydrocarbon composite electrolyte membranes of the present invention formed by the above processes have numerous advantages that stem from the bonding between the hydrocarbon polymers and the graphene nanostructures.

The glass transition temperature (Tg) is increased compared to the existing hydrocarbon electrolyte membranes, and thus the thermal resistance is increased.

The mechanical strength of the hydrocarbon composite electrolyte membranes is increased, the dimensional changes that occur from hydration/dessication are reduced, thereby improving the mechanical stability.

The complexity of the gas migration path is increased, and thus the gas permeability is reduced compared to the existing hydrocarbon electrolyte membranes.

Moreover, when a membrane electrode assembly for a fuel cell is manufactured using the hydrocarbon composite electrolyte membrane of the present invention, it is possible to significantly reduce the manufacturing cost; consequently, when a fuel cell stack is manufactured using the membrane electrode assembly of the invention, it is possible to reduce the manufacturing cost of the fuel cell stack comprising the membrane electrode assembly.

As described above, the hydrocarbon composite electrolyte membrane according to the present invention having a structure in which graphene nanostructures are embedded into an inexpensive hydrocarbon electrolyte membrane has higher mechanical and thermochemical stability than existing conventional art hydrocarbon electrolyte membranes, and therefore produce the required performance characteristics, and reduce the manufacturing cost.

Moreover, it is possible to reduce the manufacturing costs of the MEA and the fuel cell stack comprising the MEA due to the cost reduction of the hydrocarbon composite electrolyte membrane.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A hydrocarbon composite electrolyte membrane for a fuel cell, comprising at least one composite electrolyte membrane layer having a structure in which graphene nanostructures are embedded into a hydrocarbon electrolyte membrane and at least two other insulating hydrocarbon electrolyte membrane layers,
   wherein the at least one composite electrolyte membrane layer comprises an amount of a hydrocarbon polymer of 90 to 99.9 wt % and an amount of graphene nanostructures of 0.1 to 10 wt % based on the total weight of the hydrocarbon composite electrolyte membrane, and
   wherein the at least one composite electrolyte membrane layer is sandwiched between the at least two insulating hydrocarbon electrolyte membrane layers and is electrically insulated.

2. The hydrocarbon composite electrolyte membrane of claim 1, wherein the amount of hydrocarbon polymer is selected from the group consisting of 90, 90.5, 91, 91.5, 92, 92.5, 93, 93.5, 94, 94.5, 95, 95.5, 96, 96.5, 97, 97.5, 98, 98.5, 99, and 99.9 wt % based on the total weight of the hydrocarbon composite electrolyte membrane.

3. The hydrocarbon composite electrolyte membrane of claim 1, wherein the amount of graphene nanostructures is selected from the group consisting of 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, and 10 wt % based on the total weight of the hydrocarbon composite electrolyte membrane.

4. The hydrocarbon composite electrolyte membrane of claim 1, wherein the graphene nanostructures are graphene oxide nanoflakes.

5. The hydrocarbon composite electrolyte membrane of claim 1, further comprising at least two composite electrolyte membrane layers and at least one hydrocarbon electrolyte membrane layer.

6. The hydrocarbon composite electrolyte membrane of claim 5, wherein the hydrocarbon composite electrolyte membrane layers are prepared by mixing 90 to 99.9 wt % of a hydrocarbon polymer solution and 0.1 to 10 wt % of graphene nanostructures based on the total weight of the hydrocarbon composite electrolyte membrane.

7. The hydrocarbon composite electrolyte membrane of claim 6, wherein an amount of hydrocarbon polymer solution is selected from the group consisting of 90, 90.5, 91, 91.5, 92, 92.5, 93, 93.5, 94, 94.5, 95, 95.5, 96, 96.5, 97, 97.5, 98, 98.5, 99, and 99.9 wt % based on the total weight of the hydrocarbon composite electrolyte membrane.

8. The hydrocarbon composite electrolyte membrane of claim 6, wherein an amount of graphene nanostructures is selected from the group consisting of 0.1, 0.5, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, and 10 wt % based on the total weight of the hydrocarbon composite electrolyte membrane.

9. The hydrocarbon composite electrolyte membrane of claim 5, wherein at least one hydrocarbon electrolyte membrane layer is sandwiched between the at least two composite electrolyte membrane layers.

10. A membrane electrode assembly comprising the hydrocarbon composite electrolyte membrane of claim 5.

11. A fuel cell stack comprising the membrane electrode assembly of claim 10.

12. A membrane electrode assembly comprising the hydrocarbon composite electrolyte membrane of claim 1.

13. A fuel cell stack comprising the membrane electrode assembly of claim 12.

* * * * *